United States Patent [19]
Anderson

[11] 3,823,859
[45] July 16, 1974

[54] HELICAL WEB PATH PROCESSING RACK

[75] Inventor: Robert I. Anderson, Rochester, N.Y.

[73] Assignee: Eastman Kodak Company, Rochester, N.Y.

[22] Filed: Apr. 16, 1973

[21] Appl. No.: 351,202

[52] U.S. Cl................. 226/118, 226/189, 95/94 R
[51] Int. Cl........................................... B65h 17/42
[58] Field of Search.................... 226/118, 119, 189; 95/94 R, 95

[56] References Cited
UNITED STATES PATENTS
2,133,109  10/1938  Munson ............................. 226/189
1,574,591  2/1926  Adatte ................................ 95/94 R
3,122,086  2/1964  Fitch .................................. 95/94 R
3,729,255  4/1973  Reick et al. ....................... 95/94 R Primary Examiner—Richard A. Schacher
Assistant Examiner—Gene A. Church

[57] ABSTRACT

A helical web or film path processing rack for use in a processing device comprising a tray having a plurality of semi-cylindrical cavities arranged in parallel side-by-side relation. The tray is in vertical register with a shaft, and each cavity has planar sides lying in parallel planes transverse to a plane passing through the axis of the shaft and through the centers of the openings in the upper surface of the tray defining the cavities. The tray supports a plurality of film spools extending into the cavities.

8 Claims, 5 Drawing Figures

PATENTED JUL 16 1974 3,823,859

HELICAL WEB PATH PROCESSING RACK

BACKGROUND OF THE INVENTION

1. Field of the Invention

This invention relates generally to a processing apparatus, and more specifically to a helical web path processing rack.

2. Description of the Prior Art

Processing apparatus of the type comprising a plurality of web or film racks, each having top and bottom spool assemblies aligned to progressively transport a film from one end of the rack to the other along a helical path are known in the art. In a typical helical film path processing rack for a photographic processing apparatus, the top and bottom spools are mounted on parallel shafts lying in the same plane, and to obtain the desired helical path, the film is displaced laterally at least half its width during its travel between upper and lower spools. Such film displacement causes the film to approach the spool non-perpendicular to the spool axis resulting in the generation of a tracking force on the film tending to return the film to a position perpendicular to the spool axis. This tracking force is resisted by the trailing flanges of the spools which exert a guiding force on the film edge in opposition to the tracking force. Such trailing flanges guide the film relatively satisfactorily with films having a sufficiently thick support, such as 5 mils thickness or greater. However, in those situations in which the film support is thinner, such as substantially 2.5 mils, the film doesn't in all situations respond to the guiding force applied to it by the trailing spool flanges causing the thin film to buckle, twist, climb the spool flanges, or fold over resulting in problems such as improper processing and film edge damage. This problem is substantially eliminated by the photographic processing apparatus disclosed in U. S. Pat. No. 2,122,086, in which the lower film spools are free-floating in parallel arranged tanks, each lying in a plane transverse to the upper shaft. Accordingly, in this prior art apparatus, the film is twisted during its travel between the upper and lower film spools so that the film at all times approaches a film spool along a line that is perpendicular to the axis of the film spool with the film lying in a plane parallel to the spool axis. Accordingly, no force is applied to the film to generate the helical path, and axial movement of the film from one end of the rack to the other along a substantially helical path without subjecting the film to tracking forces is achieved. However, the apparatus is, among other things, complicated and costly to manufacture.

SUMMARY OF THE INVENTION

In accordance with a preferred embodiment of the invention, a helical film path processing rack is disclosed for use in a processing apparatus such as a photographic processing apparatus. The film rack comprises an upper spool assembly of known type having a shaft for supporting a plurality of axially spaced film spools. The lower film spool assembly comprises a tray in register with the shaft and having a plurality of parallel, axially spaced film spool receiving cavities in which each side of the cavity lies in a plane that is transverse to a plane extending through the axis of the upper shaft and through the centers of the openings in the upper surface of the tray defining the cavities. The film tray is further provided with means for mounting the lower film spools with the spools extending into the cavities. The lower film spools are properly oriented by the cavities to eliminate the film helix, and further produce increased solution agitation upon rotation of the spools within the confined cavities. Flexible tie strip means are provided for releasably securing the film spools to the tray.

Accordingly, one of the objects and advantages of the present invention is to provide an improved helical film path processing rack that is of simple design and construction, thoroughly reliable and efficient in operation, and economical to manufacture.

Other objects and advantages of this invention are to provide an improved helical film path processing rack that improves film tracking and solution agitation, contains few parts, and effectively removes the film helix angle.

The invention and its objects and advantages will become more apparent from the detailed description of the preferred embodiments presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Because processing apparatus are well known, the present description will be directed in particular to elements forming part of, or cooperating more directly with, apparatus in accordance with the present invention. Elements of a processing apparatus not specifically shown or described herein should be understood to be selectable from those known in the art.

Figure 1:
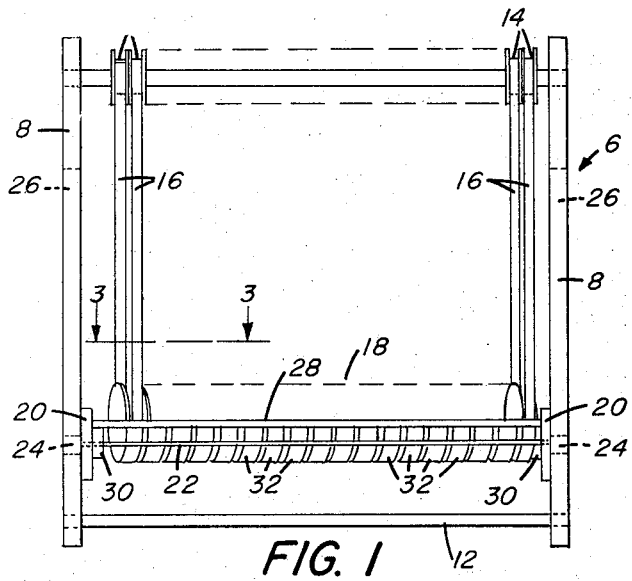
FIG. 1 is a front elevational view illustrating a film processing rack constructed in accordance with a preferred embodiment of this invention.
Figure 2:
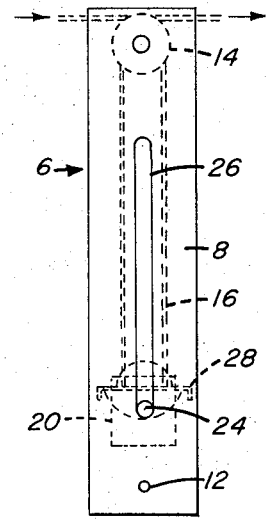
FIG. 2 is a side elevational view of the film rack of FIG. 1.

With reference to FIG. 1 of the drawing, a film processing rack 6 is disclosed which is insertable as a unit within a processing tank, not shown, of any suitable processing apparatus such as a photographic processing apparatus. In such apparatus, a processing tank is provided at each processing station, such as a developing station, a fixing station, a washing station or the like. One or more of the processing racks 6 may be inserted in side-by-side relation in each of the tanks depending on the type of material being processed, and the particular processing procedure for that material.

The film processing rack 6 comprises a pair of spaced side frames 8 secured together by an upper stationary shaft 10 and a lower stationary rod 12. The rack 6 has an upper film spool assembly comprising the aforementioned shaft 10 secured at each end to side frames 8 by any suitable means. The shaft 10 supports a plurality of axially spaced film spools 14 of any known type rotatably mounted on the shaft or on bearings secured to the shaft. The film spools 14 are axially positioned on shaft 10 such that the film reach 16 to and from the lower film assembly, now to be described, is substantially vertical.

Figure 3:
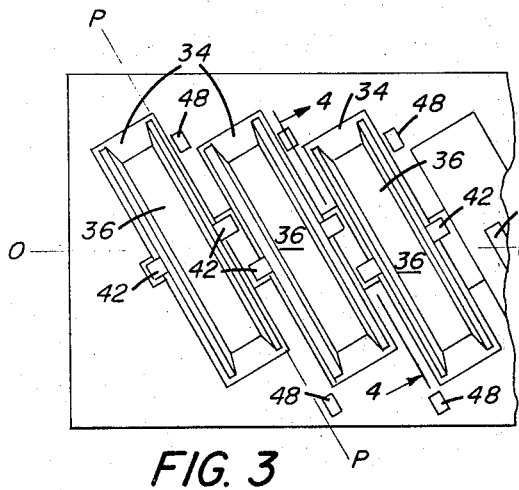
FIG. 3 is an enlarged section view taken substantially on line 3—3 of FIG. 1.
Figure 4:
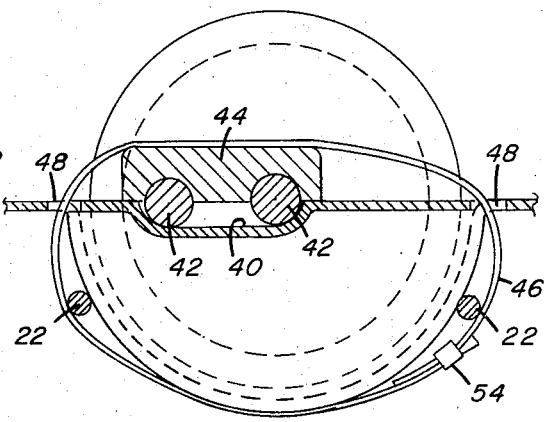
FIG. 4 is an enlarged section view taken substantially along line 4—4 of FIG. 3.
Figure 5:
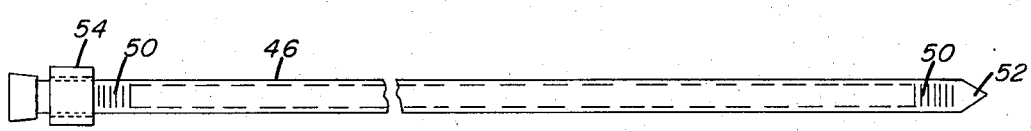
FIG. 5 is a top plan view of a tie strip used in this invention.

The lower film spool assembly comprises a bracket 18 having side plates 20 secured together by a pair of rods 22. These side plates 20 are provided with laterally extending stub shafts 24 which can be secured to side frames 8 to provide a rigid lower assembly, or can be insertable within elongated slots 26 in side frames 8 to provide an elevator bracket. The elevator bracket shafts 24 are reciprocally movable within the elongated slots 26 as the film loops 16 on the upper and lower film assemblies shorten or lengthen during the processing operation. A tray 28 preferably molded of any suitable material such as plastic or the like is mounted on bracket 18 with the tray ends resting on flanges 30 secured to side plates 20. The tray 28 comprises a plurality of parallel, preferably semi-cylindrical, depending housings 32 defining film spool receiving cavities 34, each having side surfaces lying in a plane P—P (FIG. 3) that is transverse to an imaginary plane O—O extending through the axis of shaft 10 and through the centers of each of the cavities 34 at the upper surface of the housings. The cavities 34 within housings 32 are preferably semi-cylindrical, and are arranged to hold a plurality of film spools 36 similar to spools 14 in an orientation such that the center of the film 16 leaving an upper spool 14 is in register with the center of the film approaching the lower spool 36, and the center of the film departing from the lower spool 36 is in register or vertically aligned with the center of the next adjacent upper spool 14. Accordingly, the film reaches between the upper and lower spools are all substantially vertical. The axial movement of the film 16 from one end of the rack to the other end is achieved by the canted lower spool 36 with the film approaching each of the lower film spools along a line perpendicular to the spool axis with the film lying in a plane parallel to the spool axis. Each of the cavities 34 is further provided with an opening 38 (FIG. 3) at the bottom thereof to provide solution drainage when the tank is drained, and during upward movement of the elevator bracket 18 and tray 28. The tray 28 is provided with notches 40 along the side surfaces of the cavities for receiving and supporting the ends of one or two shafts 42 onto which the film spools 36 of any suitable type are rotatably mounted. The stub shafts 42 of any two adjacent film spools 36 are positioned in side-by-side relation within a notch 40 as best seen in FIGS. 3 and 4, and retained therein by a shaft retainer 44 mounted over the stub shaft ends, and a tie strip 46 of a commercially available type, as illustrated in FIG. 5, threaded around retainer 44, through openings 48 in the tray 28 and around rods 22 of elevator bracket 18 for releasably securing stub shafts 42 to the tray when the ends thereof are secured together. The tie strip 46 has serrations 50 at each end, and one end 52 of the tie strip is inserted in an opening in a slidable latch member 54 which permits movement of strip end 52 in a tightening direction, but prevents movement of the strip end in a direction to loosen the strip.

The invention has been described in detail with particular reference to a preferred embodiment thereof, but it will be understood that variations and modifications can be effected within the spirit and scope of the invention as described hereinabove.

I claim:

1. In a helical web path processing device, the combination comprising:
    a shaft for supporting a plurality of parallel web supporting first spools;
    a tray spaced from and in register with said shaft, said tray having a plurality of cavities; and
    means for rotatably supporting a plurality of second spools on said tray with each of said second spools partially extending into one of said cavities, said first and second spools being angularly oriented relative to one another to guide a web threaded over said first and second spools from one end of said shaft to the other along a helical path with the web reaches extending between said first and second spools being substantially vertical.

2. The invention according to claim 1 wherein each of said cavities have side surfaces lying in a plane transverse to a plane passing through the axis of said shaft and the centers of said cavities.

3. The invention according to claim 2 wherein said cavities are substantially semi-cylindrical.

4. The invention according to claim 1 wherein said tray comprises a plate having openings therein defining cavities, each of said cavities having side surfaces lying in a plane transverse to a plane passing through the axis of said shaft and the centers of said openings.

5. The invention according to claim 4 wherein said cavities are semi-cylindrical.

6. The invention according to claim 1 wherein said supporting means comprises a stub shaft on each of said second spools, means on said tray adjacent each cavity for receiving and supporting the end of at least one of said stub shafts, and fastening means on said tray for releasably securing said one end of said stub shaft to said receiving and supporting means.

7. The invention according to claim 6 wherein said receiving and supporting means comprises notches in said tray, and said fastening means comprises a flexible tie strip.

8. The invention according to claim 6, and further comprising retaining means mountable on said end of said stub shaft, and said fastening means comprises a flexible tie strip encircling said retaining means and a portion of said tray.

* * * * *

PO-1050
(5/69)

UNITED STATES PATENT OFFICE
CERTIFICATE OF CORRECTION

Patent No. 3,823,859         Dated July 16, 1974

Inventor(s) Robert I. Anderson

It is certified that error appears in the above-identified patent and that said Letters Patent are hereby corrected as shown below:

Claim 1, lines 3 and 4, delete "for supporting a plurality of parallel web supporting first spools".

Claim 1, between lines 4 and 5 insert --a plurality of parallel web supporting first spools rotatably supported by said shaft;

Claim 1, line 6, delete "and"

Claim 1, between lines 6 and 7 insert --a plurality of second spools; and--.

Claim 1, line 7, delete "a" and insert --said--.

Signed and sealed this 19th day of November 1974.

(SEAL)
Attest:

McCOY M. GIBSON JR.
Attesting Officer

C. MARSHALL DANN
Commissioner of Patents